L. C. ARNAUD.
CHANGE OF SPEED MECHANISM.
APPLICATION FILED APR. 28, 1910.

999,691.

Patented Aug. 1, 1911.
2 SHEETS—SHEET 1.

WITNESSES:

INVENTOR,
LOUIS CAMILLE ARNAUD.
Attorney.

L. C. ARNAUD.
CHANGE OF SPEED MECHANISM.
APPLICATION FILED APR. 28, 1910.
999,691.
Patented Aug. 1, 1911.
2 SHEETS—SHEET 2.
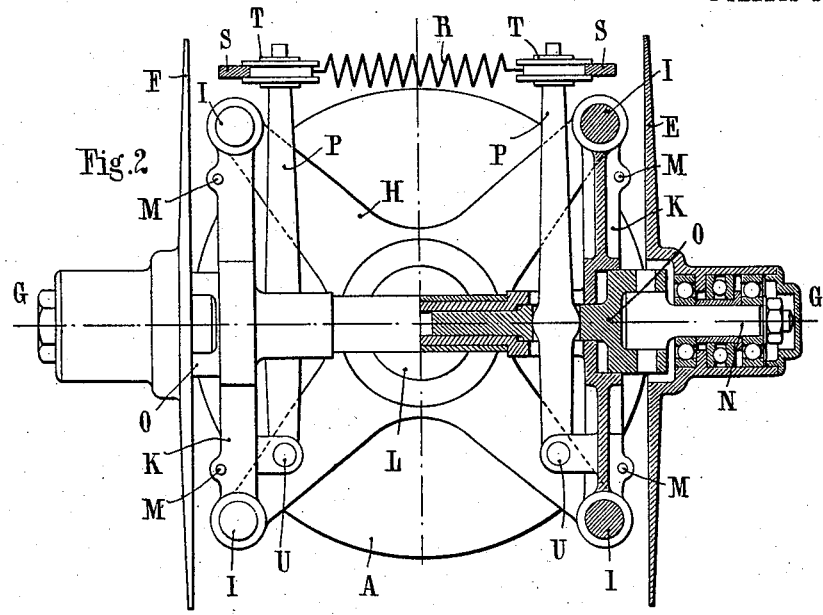
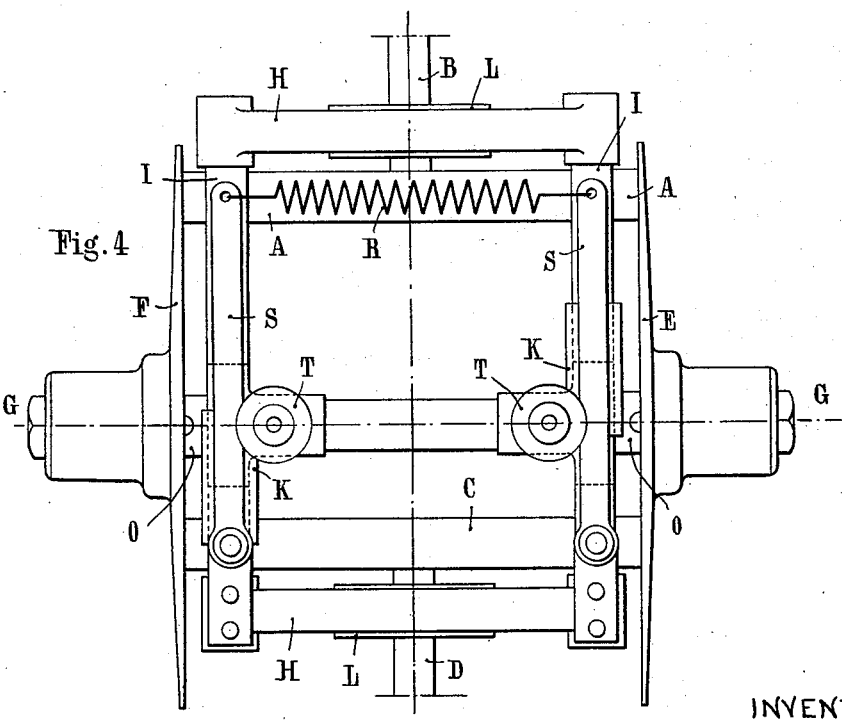
WITNESSES:
INVENTOR,
LOUIS CAMILLE ARNAUD,
Attorney.

UNITED STATES PATENT OFFICE.

LOUIS CAMILLE ARNAUD, OF FORCALQUIER, FRANCE.

CHANGE-OF-SPEED MECHANISM.

999,691. Specification of Letters Patent. Patented Aug. 1, 1911.

Application filed April 28, 1910. Serial No. 558,222.

*To all whom it may concern:*

Be it known that I, LOUIS CAMILLE ARNAUD, a citizen of the Republic of France, and residing at Forcalquier, Basses-Alpes, in France, have invented certain new and useful Improvements in Change-of-Speed Mechanism, of which the following is a specification.

My invention relates to change-of-speed mechanism.

It relates particularly to an arrangement for mounting the disks in a change-of-speed gearing which is composed of two friction wheels and two friction disks, and which is variable gradually and continuously.

Figure 1:
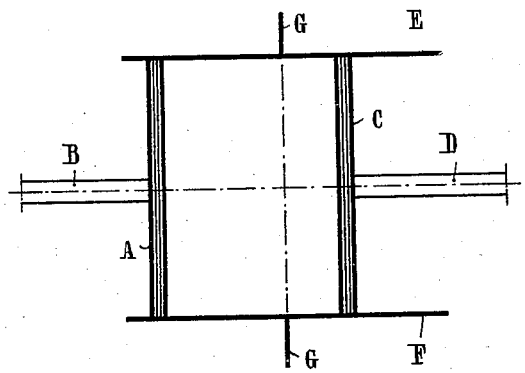
Figure 3:
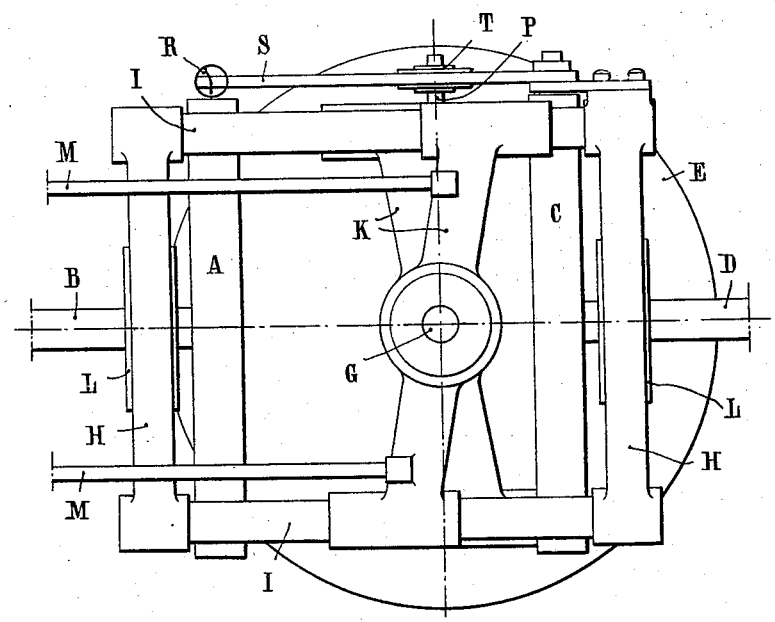

In the annexed drawings forming a part of this specification Figure 1 shows diagrammatically the system of variable speed-gearing to which the present device relates; Fig. 2 shows the device in front elevation, on the left, and in vertical section through the axis of one disk on the right. Fig. 3 is a side elevation, in which the front disk is removed, and Fig. 4 is a plan view.

Referring to the drawings: A is a friction wheel mounted on the driving shaft B; C is a friction wheel parallel to and equal in diameter to wheel A and mounted on the driven shaft D.

E and F are friction disks loosely mounted on shaft G G; H are cross-pieces; I connecting rods; L bearings for the driving and driven shafts; M the rods actuating the oblique part K; P are vertical levers; R a spring connecting the ends of the levers S which lie parallel to the direction of displacement of the disks; T are rollers on the vertical levers P, and U are the pivots for the levers S.

When the disks are brought in contact with the friction wheels, the driven wheel C revolves in a direction opposite to the direction of the driving wheel A. Changes from one speed to another are effected by displacing the disks E F relatively to wheels A C. The disengaging and engaging are effected by separating and bringing together the disks and friction wheels. The arrangement hereinafter described permits these results to be accomplished, and insures the correct setting of the disks with respect to the wheels.

The disk E revolves upon an axle journal N hinged by a vertical pivot to an axle-bearing cap O which has a cylindrical tang extension arranged to slide longitudinally in the oblique piece K. The engaging and disengaging is effected by causing the axle-bearing cap O to slide by means of a lever P which runs through it in a mortise. The two levers P are mounted on and move with the oblique piece K and tend to approach each other under the action of the spring R and the disks are thereby applied to the friction wheels. The disengagement is effected by separating these two levers P in any suitable manner as, for instance, by means of a suitable cam or two small rods connected in toggle-lever fashion, and moved by a small operating rod. It is obvious that any suitable means may be used for this purpose.

The pivoting of the journal N in the vertical cap O allows the disks to oscillate about a vertical axis which passes through the plane of their surface and which always assumes a proper contact between the friction wheels and the disks, notwithstanding the slight differences which may exist either in the diameters of the rollers or in the mounting of the oblique pieces K.

I do not herein claim all the features of my device, the other matters to which I lay claim being set forth in my pending applications Serial Nos. 558220 and 558222; but What I do claim is:

1. In a change of speed mechanism, a pair of friction wheels, shafts upon which they are mounted, a pair of friction disks, axle-journals on which the disks are mounted, axle-bearing caps provided with vertical pivots and having hinged to them the axle-journals, these axle-bearing caps being adapted to slide longitudinally and bring together or separate the disks and the wheels.

2. In a change of speed mechanism, a frame composed of cross-pieces, rods rigidly connecting the cross-pieces, oblique pieces sliding on the connecting rods, in combination with a driving and a driven friction wheel, a driving and a driven shaft on which the wheels are respectively mounted, a pair of friction disks, axle bearings on which the disks are loosely mounted, movable caps connected with the axle-bearings, vertical levers pivoted on the oblique pieces engaging the caps and causing them to slide, in order to control the relative position of the disks and the friction wheels.

In testimony whereof I affix my signature in presence of two witnesses.

LOUIS CAMILLE ARNAUD.

Witnesses:
PAUL H. CRAM,
ALLAN MACFARLANE.

Copies of this patent may be obtained for five cents each, by addressing the "Commissioner of Patents, Washington, D. C."